United States Patent
Lee et al.

(10) Patent No.: US 10,902,607 B1
(45) Date of Patent: Jan. 26, 2021

(54) FAST INSTANCE SEGMENTATION

(71) Applicant: Black Sesame International Holding Limited, Santa Clara, CA (US)

(72) Inventors: Jeff Lee, San Jose, CA (US); Guan Wang, San Jose, CA (US)

(73) Assignee: Black Sesame International Holding Limited, Santa Clara, CA (US)

( * ) Notice: Subject to any disclaimer, the term of this patent is extended or adjusted under 35 U.S.C. 154(b) by 0 days.

(21) Appl. No.: 16/706,301

(22) Filed: Dec. 6, 2019

(51) Int. Cl.
G06T 7/187 (2017.01)
G06T 7/13 (2017.01)
G06T 1/20 (2006.01)
G06T 7/194 (2017.01)
G06T 7/50 (2017.01)

(52) U.S. Cl.
CPC .............. *G06T 7/187* (2017.01); *G06T 1/20* (2013.01); *G06T 7/13* (2017.01); *G06T 7/194* (2017.01); *G06T 7/50* (2017.01)

(58) Field of Classification Search
CPC ........... G06T 7/187; G06T 7/194; G06T 1/20; G06T 7/13; G06T 7/50
See application file for complete search history.

(56) References Cited

U.S. PATENT DOCUMENTS

2003/0108237 A1* 6/2003 Hirata ................... G06K 9/4652 382/164
2017/0094243 A1* 3/2017 Venkataraman ..... H04N 13/106
2017/0278289 A1* 9/2017 Marino .............. G06Q 30/0276
2019/0088004 A1* 3/2019 Lucas .................... G06T 7/194
2020/0226769 A1* 7/2020 Das ......................... G06T 7/579

FOREIGN PATENT DOCUMENTS

WO WO-2017139516 A1 * 8/2017 ........... G05D 1/0274

OTHER PUBLICATIONS

Behavioral Pedestrian Tracking Using a Camera and LiDAR Sensors on a Moving Vehicle (Year: 2019).*
Real-time Sorting of Stacked Objects Using Depth Information (Year: 2019).*
Robust Depth Estimation for Light Field Microscopy (Year: 2019).*
Similarity-Based Segmentation of Multi-Dimensional Signals (Year: 2017).*

* cited by examiner

*Primary Examiner* — Nizar N Sivji
(74) *Attorney, Agent, or Firm* — Timothy T. Wang; Ni, Wang & Massand, PLLC

(57) ABSTRACT

A method of instance segmentation, comprising, defining a bounding box, depth mapping the bounding box, sorting the depth map, estimating stability due to noise of the sorted depth map, detecting low frequency jumps of the sorted depth map based on the estimated stability, detecting high frequency jumps of the sorted depth map, comparing the detected low frequency jumps and the detected high frequency jumps, detecting at least one of a largest object and a closest object based on the comparison and pixel masking the at least one of the largest object and the closest object.

8 Claims, 5 Drawing Sheets

FAST INSTANCE SEGMENTATION

BACKGROUND

Technical Field

The instant disclosure is related to instance segmentation and specifically providing a fast instance segmentation that may be utilized with automated valet parking.

Background

Instance segmentation is an essential function for robotic applications such as autonomous driving, drones, large scale augmented reality and the like. The goal of instance segmentation is to define a bounding box, a label for the bounding box, and a pixel-wise mask for a detected object. Most instance segmentation techniques solely use a red blue green (RGB) image and utilize neural networks to distinguish the background from underlying objects.

In systems based on embedded systems, reduced computational cost and run time are highly sought after.

SUMMARY

A first example method of instance segmentation, comprising at least one of defining a bounding box, depth mapping the bounding box, sorting the depth map, estimating stability due to noise of the sorted depth map, detecting low frequency jumps of the sorted depth map based on the estimated stability, detecting high frequency jumps of the sorted depth map, comparing the detected low frequency jumps and the detected high frequency jumps, detecting at least one of a largest object and a closest object based on the comparison and pixel masking the at least one of the largest object and the closest object.

A second example method of instance segmentation, comprising at least one of defining a bounding box, depth mapping the bounding box, sorting the depth map, estimating stability due to noise of the sorted depth map, detecting low frequency jumps of the sorted depth map based on the estimated stability, determining a low frequency jump index based on the detected low frequency jumps, detecting high frequency jumps of the sorted depth map based on high-pass filtering, determining a high frequency jump index based on the detected high frequency jumps, grouping the low frequency jump index and high frequency jump index based on local minimums and maximums to form a grouped jump index, comparing the depth map to the grouped jump index, detecting at least one of a largest object and a closest object based on the comparison and pixel masking the at least one of the largest object and the closest object.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims the terms "including" and "comprising" are used in an open-ended fashion, and thus may be interpreted to mean "including, but not limited to . . . " Also, the term "couple" or "couples" is intended to mean either an indirect or direct connection. Thus, if a first device couples to a second device that connection may be through a direct connection or through an indirect connection via other devices and connections.

Figure 1:
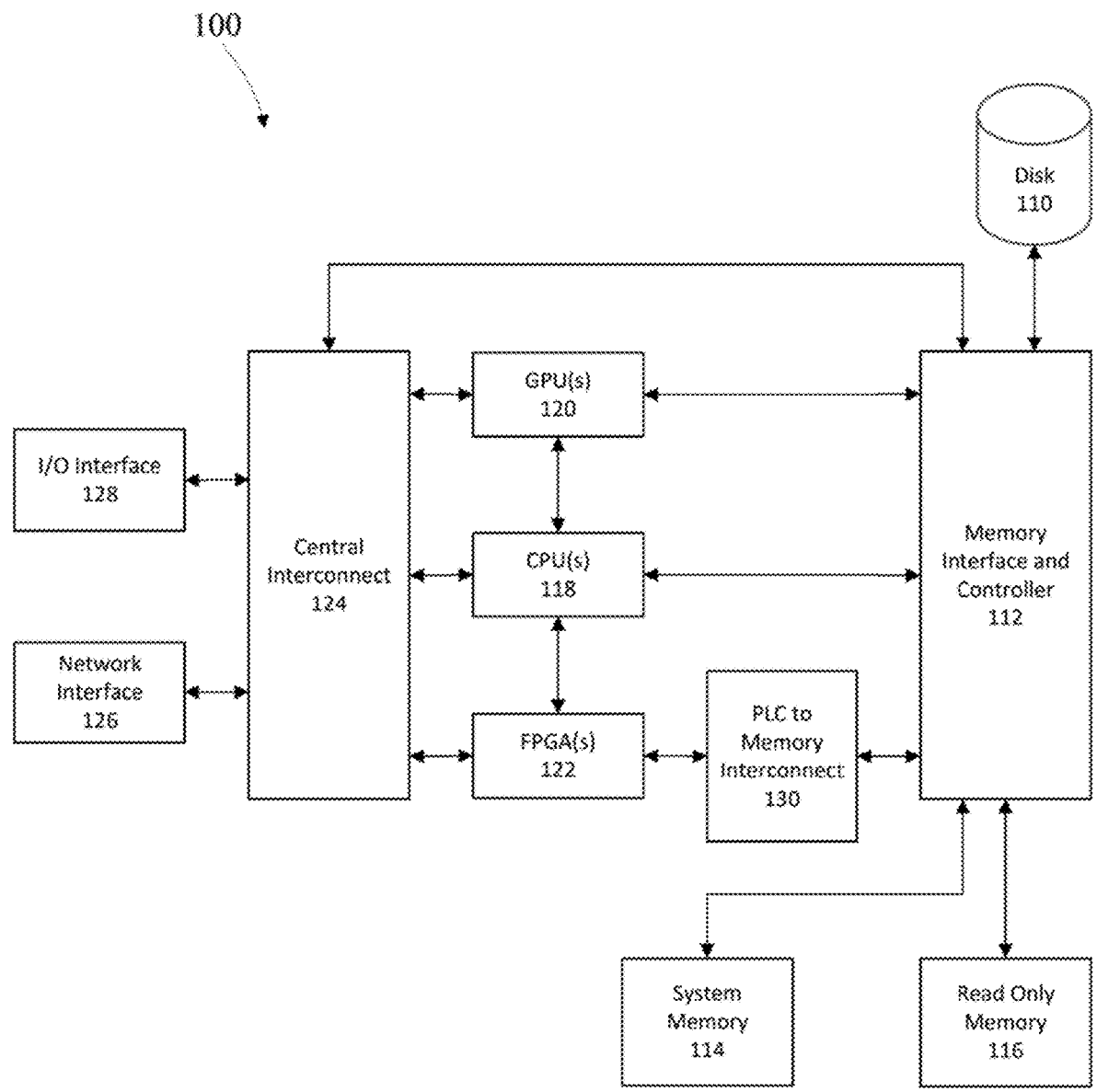
FIG. 1 is a first example system diagram in accordance with one embodiment of the disclosure.

FIG. 1 depicts an example hybrid computational system 100 that may be used to implement neural nets associated with the operation of one or more portions or steps of processes 300, 400 and 500. In this example, the processors associated with the hybrid system comprise a field programmable gate array (FPGA) 122, a graphical processor unit (GPU) 120 and a central processing unit (CPU) 118.

The processing units 118, 120 and 122 have the capability of providing a neural net. A CPU is a general processor that may perform many different functions, its generality leads to the ability to perform multiple different tasks, however, its processing of multiple streams of data is limited and its function with respect to neural networks is very limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected to one other and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

Figure 2:
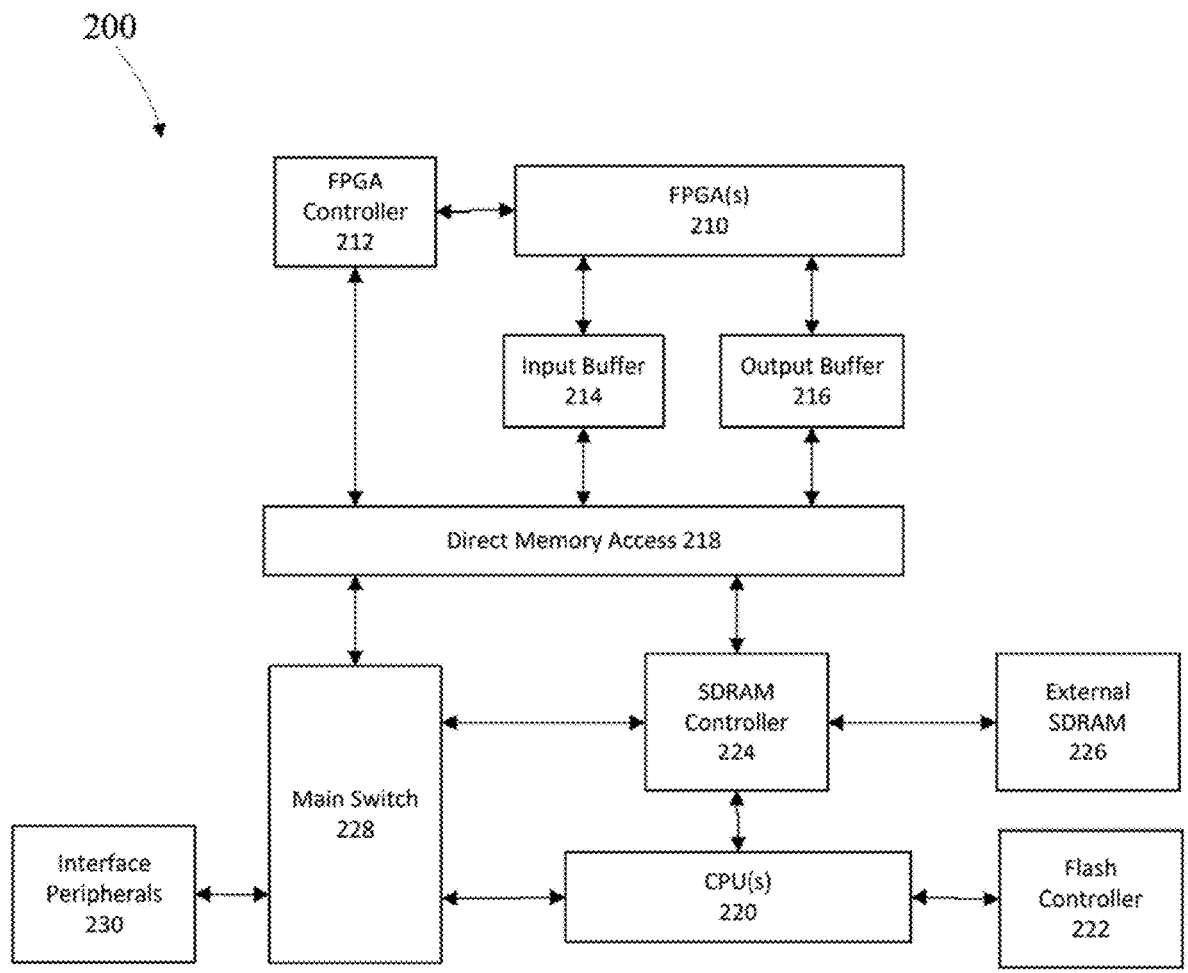
FIG. 2 is a second example system diagram in accordance with one embodiment of the disclosure.

The system of FIG. 2 may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

FIG. 2 depicts a second example hybrid computational system 200 that may be used to implement neural nets associated with the operation of one or more portions or steps of process 600. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, both of which are coupled to the FPGA to buffer data into and out of the FPGA respectively. The DMA 218 has two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an synchronous dynamic random access memory (SDRAM) controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

Currently instance segmentation is based on neural network solutions such as Mask-RCNN. One possible issue associated with using a pure neural network solution is that instance segmentations may take on the order of two seconds, which is too long for use in automotive decision making. A fusioned object detection and depth mapping approach is described which may provide a solution.

In the instant disclosure an object bounding box is defined. In one example, the bounding box objects a sorted the depth map is determined and an Allen deviation is determined. The Allen deviation variance is utilized as a threshold in the detection of low frequency jumps having a low frequency jump index within the sorted depth map. High frequency jumps are determined utilizing a Butterworth high pass filter leading two a high frequency jump index. A local min-max is performed on the low frequency jump index and the high frequency jump index so as to group jump indexes. Histograms of the depth values are determined between each jump index and compared to identify either the largest or closest object. Descriptive statistics are utilized to distinguish between the background and the object in the case that the background occupies most of the bounding box.

The disclosure describes fast sensor fusioned instance segmentation. The digital signal process pipeline has a computation complexity of O(3n), which takes 0.05 seconds per frame to determine. O(3n) represents the complexity of a function that increases linearly and at three times the proportion to the number of inputs. In comparison, neural network solutions like Mask-RCNN take around 2 secs per frame. The disclosed fusioned instance segmentation achieves masked object accuracies comparable to Mask-RCNN. Current non neural network instance segmentations sacrifice accuracy to achieve higher frames per second, by utilizing a mobile net or other smaller models, the disclosed method balances achieves both high performance and high accuracy utilizing a fundamentally different approach.

The method described is the fusion of object detection and depth mapping to determine an object mask. The method described is a combination of digital signal and neural network processing to achieve high performance at high speed.

Figure 3:
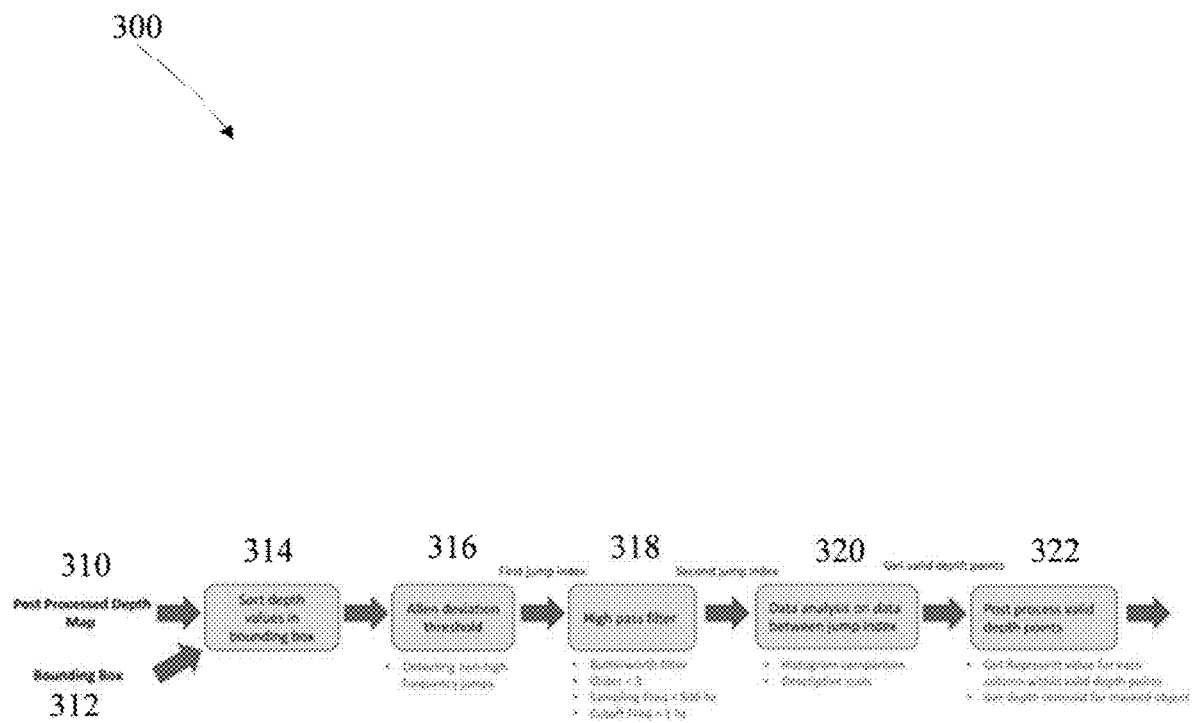
FIG. 3 is a first example flow of instance segmentation in accordance with one embodiment of the disclosure.

FIG. 3 depicts a first example flow diagram of fast instance segmentation. In this example data from a post processed depth map 310 and a bounding box 312 are fed into a depth map sorter 314 that sorts the depth values of the depth map within the defined bounding box. A low frequency jump detector 316 detects non-high frequency jumps utilizing an Allen deviation detector. The Allen deviation is used to set a threshold which is utilized to determine low frequency jumps. The output from the low frequency jump detector is a first jump index, which is a low frequency jump index. The depth values of the depth map are input into a high pass filter 318 to detect high frequency jumps. In this example the high frequency filter is a Butterworth filter of order 3, having a sampling frequency of 500 hertz and a cutoff frequency of 1 hertz. The detected jumps from the high frequency detector are utilized to form a second jump index, which is a high frequency jump index. A comparator 320 utilizes the data from the low frequency jump index, the first jump index and the data from the high frequency jump index, the second index to do a histogram comparison of the jump indexes. The output of the comparator is a set of validated depth points. The validated depth points are utilized by a post-processor 322 to determine a set of depth centroids for masked objects. In this way object masking and validated depth mapping are combined to determine object masks.

Figure 4:
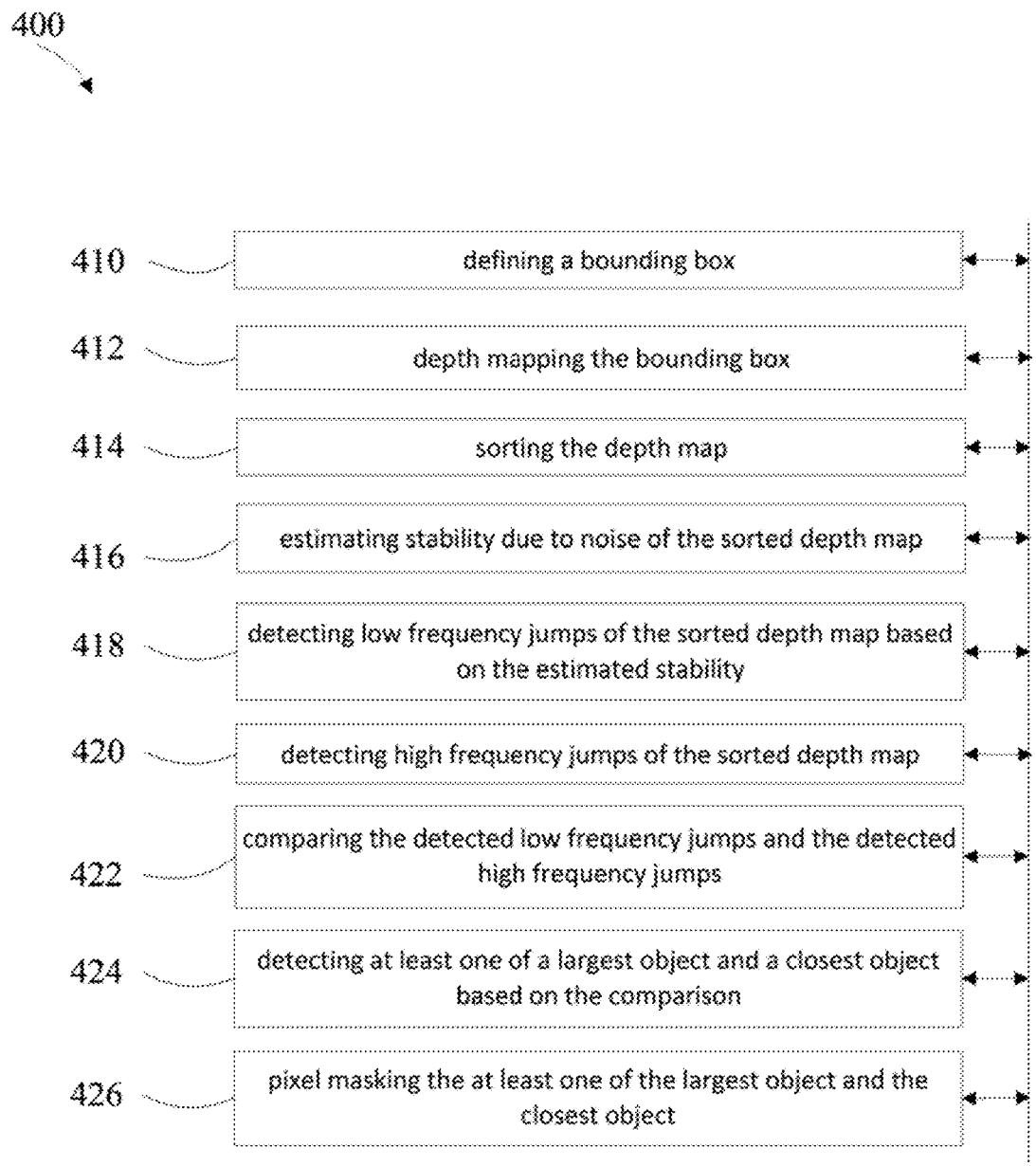
FIG. 4 is a second example flow of instance segmentation in accordance with one embodiment of the disclosure.

FIG. 4 depicts a second example method of instance segmentation, including, defining 410 a bounding box, depth mapping 412 the bounding box, sorting 414 the depth map and estimating stability 416 due to noise of the sorted depth map. The method also includes detecting 418 low frequency jumps of the sorted depth map based on the estimated stability, detecting 420 high frequency jumps of the sorted depth map and comparing 422 the detected low frequency jumps and the detected high frequency jumps. The method detects 424 at least one of a largest object and a closest object based on the comparison and pixel masking 426 the at least one of the largest object and the closest object.

The method may also include labelling the bounding box, determining between a background and the at least one of the largest object and the closest object based on the statistical comparison and determining the depth centroid of the at least one of the largest object and the closest object.

The estimation of stability may be based on an Allen deviation and the detection of low frequency jumps utilizes the Allen deviation as a threshold. The detection of the high frequency jumps may be based on a Butterworth filter having an order of 3, a sampling frequency of 500 hertz and a cutoff frequency of 1 hertz. The comparison of the low frequency jumps and high frequency jumps may be based on histogram analysis.

Figure 5:
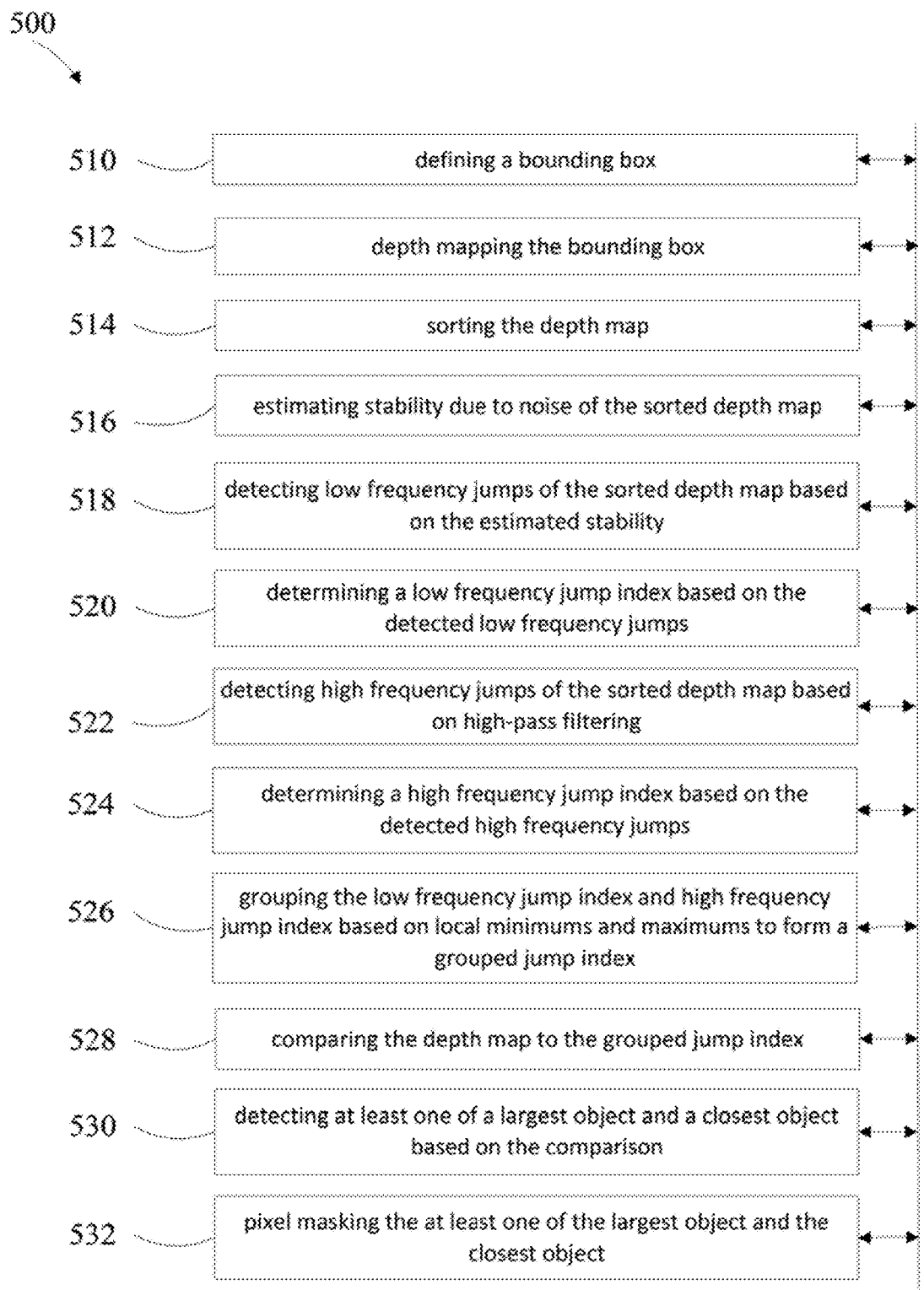
FIG. 5 is a third example flow of instance segmentation in accordance with one embodiment of the disclosure.

FIG. 5 depicts a third example method of instance segmentation, including, defining 510 a bounding box, depth mapping 512 the bounding box, sorting 514 the depth map and estimating 516 stability due to noise of the sorted depth map. The method also includes detecting 518 low frequency jumps of the sorted depth map based on the estimated stability, determining 520 a low frequency jump index based on the detected low frequency jumps, detecting 522 high frequency jumps of the sorted depth map based on high-pass filtering and determining 524 a high frequency jump index based on the detected high frequency jumps. The method includes grouping 526 the low frequency jump index and high frequency jump index based on local minimums and maximums to form a grouped jump index and comparing 528 the depth map to the grouped jump index. The method detects 530 at least one of a largest object and a closest object based on the comparison and pixel masks 532 the at least one of the largest object and the closest object.

The method may also include labelling the bounding box, determining between a background and the at least one of the largest object and the closest object based on the statistical comparison and determining the depth centroid of the at least one of the largest object and the closest object.

The estimation of stability may be based on an Allen deviation and the detection of low frequency jumps utilizes the Allen deviation as a threshold. The detection of the high frequency jumps may be based on a Butterworth filter having an order of 3, a sampling frequency of 500 hertz and a cutoff frequency of 1 hertz. The comparison of the low frequency jumps and high frequency jumps may be based on histogram analysis.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of instance segmentation, comprising:
defining a bounding box;
depth mapping the bounding box;
sorting the depth map;
estimating stability due to noise of the sorted depth map;
detecting low frequency jumps of the sorted depth map based on the estimated stability;
determining a low frequency jump index based on the detected low frequency jumps;
detecting high frequency jumps of the sorted depth map based on high-pass filtering;
determining a high frequency jump index based on the detected high frequency jumps;
grouping the low frequency jump index and high frequency jump index based on local minimums and maximums to form a grouped jump index;
comparing the depth map to the grouped jump index;
detecting at least one of a largest object and a closest object based on the comparison; and
pixel masking the at least one of the largest object and the closest object.

2. The method of claim 1, further comprising labelling the bounding box.

3. The method of claim 1, further comprising determining between a background and the at least one of the largest object and the closest object based on the statistical comparison.

4. The method of claim 1, further comprising determining the depth centroid of the at least one of the largest object and the closest object.

5. The method of claim 1, wherein estimating stability due to noise is based on an Allen deviation.

6. The method of claim 5, wherein the detection of low frequency jumps utilizes the Allen deviation as a threshold.

7. The method of claim 1, wherein the detection of the high frequency jumps is based on a Butterworth filter.

8. The method of claim 7, wherein the Butterworth filter has an order of 3, a sampling frequency of 500 hertz and a cutoff frequency of 1 hertz.

* * * * *